United States Patent
Sugawa et al.

[11] Patent Number: 5,981,028
[45] Date of Patent: Nov. 9, 1999

[54] FILM FOR MULTIPLE BAG

[75] Inventors: Michio Sugawa, Omiya; Tetsuo Matsushita, Ageo; Yuzi Fukushima, Konosu, all of Japan

[73] Assignees: Asahi Chemical Polyflex Co., Ltd., Tokyo; Orihiro Engineering Co., Ltd., Gunma-ken, both of Japan

[21] Appl. No.: 08/821,197

[22] Filed: Mar. 20, 1997

[30] Foreign Application Priority Data

Mar. 22, 1996 [JP] Japan .................................. 8-091832
Jul. 26, 1996 [JP] Japan .................................. 8-214033

[51] Int. Cl.⁶ ............................... B32B 3/24; B65B 9/06
[52] U.S. Cl. ..................... 428/137; 428/161; 428/156; 428/195; 428/194; 428/198; 428/192; 428/174; 428/141; 222/105; 383/109; 383/114; 53/451; 53/452; 53/553; 53/548; 53/554; 53/550; 53/551
[58] Field of Search .................................. 428/137, 161, 428/156, 195, 194, 198, 192, 174, 141; 222/105; 383/106, 114; 53/451, 452, 553, 548, 554, 550, 551

[56] References Cited

U.S. PATENT DOCUMENTS

| 4,342,808 | 8/1982 | Langen et al. | 428/194 |
| 4,977,807 | 12/1990 | Kai et al. | 83/676 |
| 5,766,773 | 6/1998 | Paulett et al. | 428/131 |

FOREIGN PATENT DOCUMENTS

| 755875A1 | 1/1997 | European Pat. Off. |
| 7187233 | 7/1995 | Japan . |
| 7246674 | 9/1995 | Japan . |
| WO9429104 | 12/1994 | WIPO . |

Primary Examiner—William P. Watkins III
Attorney, Agent, or Firm—Birch, Stewart, Kolasch & Birch, LLP

[57] ABSTRACT

A film for a multiple bag which film is a multiple film comprising at least two sheets of film put one on another and having scattered along its both-side edge portions spot-fused portions by which the at least two sheets of film is partially united.

14 Claims, 6 Drawing Sheets

FILM FOR MULTIPLE BAG

BACKGROUND OF THE INVENTION

1. Field of the Invention

This invention relates to a film for a multiple bag composed of at least two sheets of film which are not laminated to one another and can freely be mutually slipped, said film for a multiple bag being used for automatically making a bag and packing the bag with a liquid, a semifluid, a powder or the like for business use, the multiple bag obtained therefrom being excellent in mechanical characteristics such as pinhole resistance, drop impact strength and the like and the said film for a multiple bag being much superior in workability in an automatic bag-making-and-packing machine.

2. Description of the Related Art

Materials such as liquid, semifluid, powder and the like for business use have heretofore been packed in a metal container and then put to distribution including transportation, custody, sale and the like. However, metal containers are disadvantageous in that they are bulky even after use, the contents of the containers are difficult to take out, the treatment of the containers after use is difficult, etc.

A packaging method called "in-box" by which the above contents are packed in a plastic-made bag and the thus packed bag is placed in a corrugated box and distributed is now being widely put to practical use.

In the case of packed bags for the in-box, it is preferable to effect the packing by an automatic bag-making-and-packing machine in view of the efficiency of the contents-packing. On the other hand, the packed bag contains a large weight of contents and has a large size, and hence, is required to have a high mechanical strength. Also, the contents are often fluids, semifluids or powders which are easily escaped from a small rent of the container and are, once escaped, difficult to treat, and the packed bag is required to have mechanical strength characteristics such as drop impact resistance, pinhole resistance, cold resistance and the like.

In order to increase the strength of the packed bag, there is well-known a method in which high-strength films of nylon, polyester or the like are laminated through a fusible layer. For further enhancing the strength, it is possible to laminate other various films or increase the thickness of the high-strength film; however, the extreme increase of the thickness of the film hardens the film, and as a result, the flexure stress applied to the film is increased, the flexural fatigue, pinhole resistance and drop impact resistance are deteriorated, and the packing workability is lowered. Therefore, at present, the above problem cannot be solved by only increasing the thickness of the film.

Under such circumstances, there has been proposed a multiple bag in which the films constituting the bag are not laminated and are in the mutually movable state. In the case of this multiple bag, even when a pinhole is formed in one sheet of film, the other sheets of film are flaw-free, and even when one independent sheet of film receives the flexure stress another sheet of film can be slipped to be escaped from the flexure stress, so that there is no fear that an extreme large flexure stress may be applied. Therefore, the bag has excellent mechanical strength characteristics and is excellent as a bag for the bag-in-box.

However, when diverse films are merely put on one another and rolled in an automatic bag-making-and-packing machine, the films cause position deviation and winding breakage, and hence, this method has been by no means put to practical use.

Accordingly, a multiple film in which films are merely put on one another cannot be used in an automatic bag-making-and-packing machine, and hence, the multiple bag actually used is employed in a system in which bag-making and packing are separately carried out, that is, a system in which a previously prepared multiple bag with a tap is packed with the contents introduced through the tap. This system is inferior in working efficiency and it is unavoidable for air to remain in the sealed bag. Hence, there is such a fear that the remaining air may accelerate the deterioration of the contents.

On the other hand, there is proposed a method in which diverse films are previously continuously fused at their both-side edge portions to one another and then fed to an automatic bag-making-and-packing machine. However, even in this method, the diameter of a roll formed by winding the inside film and the diameter of a roll formed by winding the outside film are delicately different, and hence, when the films are wound repeatedly, said delicate difference in diameter results in a wrinkle and a sag and when the films wound up become disordered, so that only a small roll of film can be provided, and owing to a frequent roll-exchange, at present, the workability as a whole is not enhanced.

In addition, this method comprises a step of fusing both-side edge portions of the films and this step requires a given heating time and hence requires a long period of time as a whole for the processing. Therefore, the method is not practical.

Thus, there have been required films from which a multiple bag can be easily produced using an automatic bag-making-and-packing machine.

SUMMARY OF THE INVENTION

According to this invention, there is provided a film for a multiple bag which film is a multiple film comprising at least two sheets of film put one on another, and having scattered along its both-side edge portions spot-fused portions by which at least two sheets of film are partially united, the spot-fused portions preferably having irregularities on their surfaces or a group of fine scars provided densely on their surfaces.

According to this invention, there is further provided a process for producing a packed multiple bag, which comprises a step of forming a multiple film by putting at least two sheets of film one on another, a step of discontinuously providing spot-fused portions along both-side edge portions of the multiple film, by which spot-fused portions of the at least two sheets of film are partially united, a step of fusing the multiple film in the longitudinal direction to form a cylindrical film, a step of packing contents in the cylindrical film and fusing the cylindrical film in the transverse direction, and a step of cutting the fused portion in the transverse direction.

This invention further provides an apparatus for producing a packed multiple bag, which comprises a film-feeding means having at least two film-feeding rolls, a means for fusing in the longitudinal direction, a means for packing contents, a means for fusing in the transverse direction, a means for cutting the fused portion in the transverse direction, and a spot-fusing means for intermittently fusing at least two films fed from the said at least two film-feeding rolls in the state that the films are put one on another, along their both-side edge portions, the spot-fusing means being provided between the film-feeding means and the means for fusing in the longitudinal direction.

BRIEF DESCRIPTION OF THE DRAWINGS

FIGS. 5A and 5B are enlarged descriptive sectional views of scars in the side edge portion of an example of the multiple film of this invention wherein FIG. 5A shows a scar having a through-hole and FIG. 5B shows a through-hole-free scar.

DESCRIPTION OF THE PREFERRED EMBODIMENTS

In this invention, by providing dot-like-spot-fused portions on both-side edge portions of at least two sheets of film which are not fused nor bonded to one another and can be freely mutually moved, the at least two sheets of film are partially and integrally fused and, in the unfused portions, the at least two sheets of film can be freely mutually moved.

As a result, it is possible to wind up or unwind the at least two sheets of film as one sheet of film, and the irregularities formed by the spot-fusion are mutually entangled to prevent winding breakage, to assure the rolling of the film.

Figure 1:
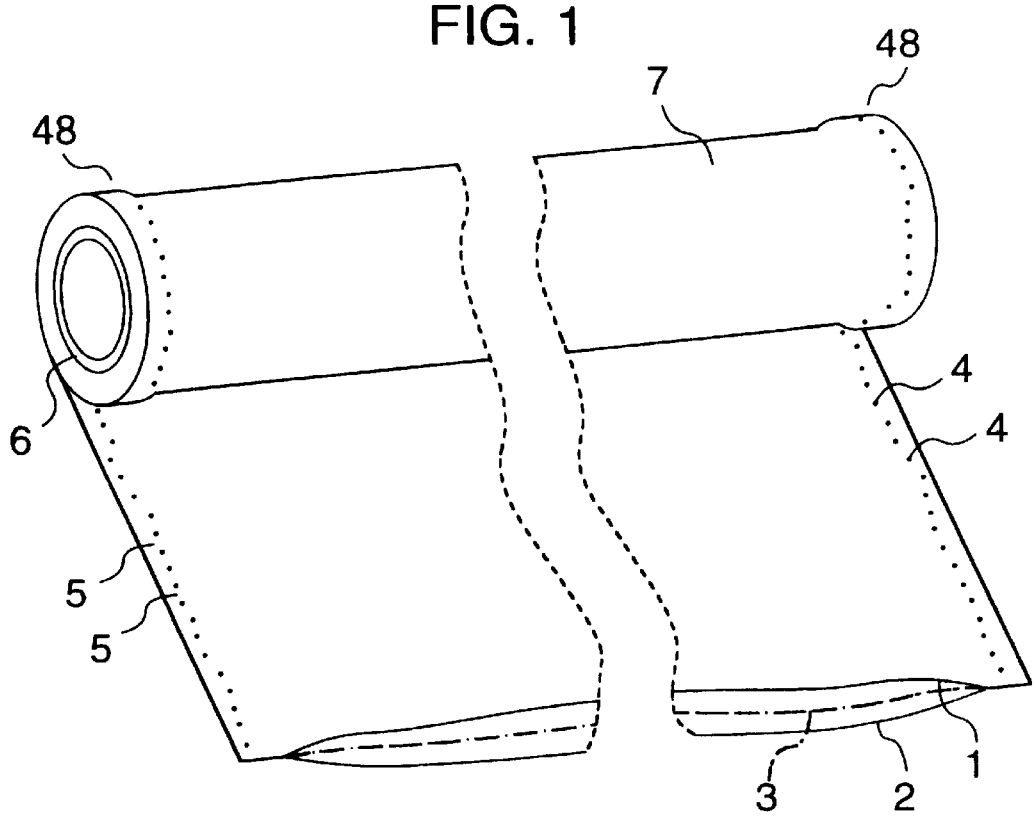
FIG. 1 is a perspective view of a film for a multiple bag which film is an example of this invention.

By allowing the spot-fused portions to be present in the somewhat thick state in only the side edge portions, the side edge portions of the film become thick, when the film is rolled, in such a state that the side edge portions rise as shown in FIG. 1. In general, the film of the innermost layer and the film of the outermost layer which are freely mutually moved are slightly different in roll diameter and this difference causes winding wrinkle. As a result, it becomes impossible to roll the film under a give tension. However, according to this invention, both-side edge portions of the film are thicker than the other portions in the rolled state and firmly rolled under the same tension, so that the rolled film is tensionless and relaxed in the center portions and the slight difference in roll diameter of the film is absorbed by this relaxed state. Therefore, the above-mentioned undesirable wrinkle and sag due to the difference in roll diameter of at least two sheets of film are not caused.

In this invention, the spot-fusions are used to unite at least two sheets of film; however, since there is some distance between one spot-fused portion and another spot-fused portion, the portions which are not spot-fused in both-side edge portions become spaces between the spot-fused portions. This space can absorb the slippage between the at least two sheets of film which can be freely mutually moved.

Accordingly, even if the diverse films are mutually wound neither wrinkle nor sag are caused and the films do not cause blocking between them, whereby a united multiple film can be smoothly unwound, so that the at least two sheets of film can be subjected to automatic bag-making and packing as if it is one sheet of film.

The spot-fused portions come to above or out-side the fused portions of the bag during the bag-making, and hence, they do not affect the air-tightness and strength of the body of bag at all.

This invention in one aspect is a multiple film in which at least two sheets of film are put one on another, and in which the above-mentioned spot-fused portions lie scattered along the side edge portions and simultaneously a group of fine scars are provided so that one of the films enter locally the adjacent film, whereby projects are formed on the surface of the said adjacent film. Moreover, in the film for a multiple bag of this invention, it is preferable that at least one surface of the film surfaces which are mutually adjacent and freely movable is roughened.

By providing a group of fine scars in both-side edge portions of at least two independent diverse films, the film portions from which the scars project have a wedge effect, whereby the films can be bonded to one another in the side edge portions, to prevent the winding breakage and to permit the films to be rolled assuredly. The scars mechanically provided project to the other surface, and hence, have such a function that at least two diverse sheets of film are entangled and fixed. In addition, when rolled, a freshly rolled film knocks against the protrusions of the film rolled just before, so that both side edge portions 48 are rolled in a thicker state as shown in FIG. 1. Furthermore, the protrusions are fitted in the concave portions of the next film to form entangled portions, whereby the film is densely rolled, so that the roll thus obtained has a less fear that the winding is broken than a roll formed by densely rolling merely the whole of a film in the width direction.

On the other hand, in the unwinding, the film in the center portion which becomes the body of a bag is rolled loosely, so that the slight difference in roll diameter between at least two mutually freely movable sheets of film is absorbed by this looseness. Accordingly, even when the diverse films are alternately wound, neither wrinkle nor sag are caused and the films are not blocked each other, and a united multiple film as such is smoothly unwound. The multiple film can be subjected to bag-making, packing and sealing as if the multiple film is one sheet of film.

This invention has such an advantageous effect as mentioned below.

According to this invention, the multiple film can be rolled under a given tension, and can be safely and efficiently subjected to bag-making, packing and sealing by an automatic bag-making-and-packing machine. The packed bag thus obtained is excellent in mechanical characteristics such as pinhole resistance, drop impact resistance, cold resistance and the like, and there is obtained a sealed bag which is preferable as a packaged bag for the bag-in-box. Moreover, since the packing of a liquid or a semifluid in a bag and sealing the packed bag by use of an automatic bag-making-and-packing machine has been made possible, such a packaging that air is not allowed to remain in the sealed bag becomes possible whereby the deterioration of the contents in the bag can be prevented.

The multiple film in this invention is a name of film given by collectively regarding two, three or more independent sheets of film which are not laminated to one another, as a one-layer film.

The multiple bag is a bag composed of the multiple film. The packed multiple bag refers to a bag prepared by putting plural sheets of film one on another, fusing the necessary ends of the resulting assembly to form a four-side-fused bag, a three-side-fused bag, a pillow-shaped bag, a gusset bag or the like, packing the bag with the contents and sealing the packed bag. The packed multiple bag may have a tap to take out the contents in small quantities.

The film for the multiple bag is a film to be used as the starting material for the multiple bag and is necessarily a multiple film. The spot-fused portions are provided at some spaces along the side edge portions, and particularly when a bag is made, they come to the above of the fused portions or the outside of the fused portions.

In this invention, the state that at least two sheets of film can be freely mutually moved refers to such a state that two or more sheets of film are not completely united with an adhesive or by fusion or co-extrusion or the like. Accordingly, each film is independent and hence is in such a state that each film can be mutually slipped to change the relative positions.

In the multiple film in this invention, at least two sheets of film are in such a state that they can be freely mutually moved and are not intimately bonded. That is to say, they are in the unlaminated state in which they are neither adhered nor fused. Each of the films composing the multiple film is not always a monolayer film, and there are widely used laminates of a fusible film such as a linear low-density polyethylene, a low-density polyethylene or the like to a tough base film such as a biaxially oriented nylon film, a biaxially oriented polyester film, a biaxially oriented polypropylene film or the like.

Moreover, depending upon the kind of the contents to be packed in the bag, a gas-barrier layer such as a polyvinylidene chloride film layer, an ethylene-vinyl alcohol resin film layer, an aluminum foil, a deposited aluminum layer or the like can be further laminated thereto.

Each of the films constituting the multiple film which can be freely mutually moved is preferably fusible on both surfaces. However, the surface of the film which becomes the outermost layer of the bag produced therefrom need not be fusible.

The contacting surfaces of each of the films which can be freely mutually moved are preferably subjected to roughening processing. The roughening processing means a processing for providing fine irregularities on the film surfaces, and is generally called satin finish. The film can be processed by, for example, a method in which a mat roll having fine irregularities on its surface is used as a cooling roll when the film is prepared, a method in which the film is sandblasted or pressed by a working tool having a hard irregular surface, or other methods. The film surface subjected to roughening processing has irregularities, so that the films contact with one another only at convex portions, whereby the contacting area is substantially reduced and becomes more easy to slip. As a result, the performance as a multiple film is enhanced. It is preferable to subject both contacting surfaces of at least two sheets of film which can be freely mutually moved, to the roughening processing. However, even when only one of the contacting surfaces is subjected to the roughening processing, the effect of this invention is obtained.

Figure 2:
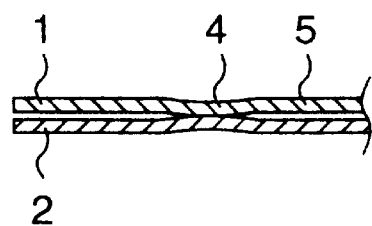
FIG. 2 is an enlarged descriptive view of an example of the spot-fused portion of the film of this invention.
Figure 3:
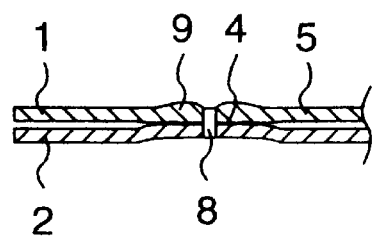
FIG. 3 is an enlarged descriptive view of another example of the spot-fused portion of the film of this invention.
Figure 4:
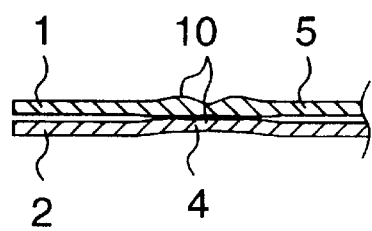
FIG. 4 is an enlarged descriptive view of a further example of the spot-fused portion of the film of this invention.

FIG. 1 is a perspective view of the rolled film for a multiple bag of this invention, and FIGS. 2 to 4 are enlarged diagrammatic view of spot-fused portions.

In the drawings, 1 refers to the first film, 2 to the second film and 3 shown in an imaginary line to the third film if used. 4 refers to a spot-fused portion and the unfused portion present between one spot-fused portion 4 and another spot-fused portion 4 is a space 5 between the spot-fused portions. The wrinkle and sag caused when the multiple film is rolled are absorbed by the space 5 and a multiple film rolled tightly under a uniform tension is obtained. 6 refers to a paper tube for rolling and 7 to a rolled multiple film.

The spot-fusion in this invention refers to such a state that all films constituting the multiple film are locally, namely, partially fused. In some cases, the spot-fusion may be replaced by bonding with an adhesive and the effect of this invention can be obtained as far as the all films of the multiple film are locally united.

Furthermore, the fusion in this invention includes various states, for example, such a state that the films are only fused to and fixed on one another as shown in FIG. 2; such a state that as shown in FIG. 3, a perforation 8 is formed at the center of the fused portion and a fused thick portion 9 is formed around the perforation; such a state that the center portion of the fused portion becomes somewhat thin as shown in FIG. 4 and irregularities 10 are caused therearound; and the like state.

The spot-fused portion means that the above fused portion is substantially dot-like and this dot-like fused portions exist apart from one another through spot-fusion spaces.

The spot-fused portion is easily formed by pressing the film by means of a heated pointed tool. When the area of the tip is small or the pressure is large, a perforation 8 as shown in FIG. 3 is formed; however, since thick portions in which the films are mutually fused are formed therearound, the effect of this invention is obtained.

When the area of the tip is large or the pressure is small, no perforation is formed, but even in this case, the center of the fused portion becomes thin as shown in FIG. 4 and thick portions are formed therearound to cause irregularities, whereby the effect of this invention is achieved.

The irregularities in the spot-fused portion has such an effect that when the film is rolled the adjacent multiple films are entangled with each other, and when the film is rolled as shown in FIG. 1, both ends 48 become thick, the multiple film per se in the center portion is consequently loosely rolled, and the rolled films are not blocked with each other, so that neither wrinkle nor sag are generated. Therefore, the subsequent automatic bag-making-and-packing step is smoothly carried out.

The shape of the spot is not critical, and include, for example, a circle shape, an oval shape, a square shape and the like.

When the spot has, for example, a circle shape, the size of the spot is 1 to 10 mm, preferably 2 to 5 mm in diameter because it is necessary that a heat applied for the fusion be transferred to the whole of the thickness of the film which can freely mutually moved. However, this size is varied depending upon the thickness of the film and the composition of the starting material for the film and in general, when the film is thin or easy to melt, a small diameter spot is sufficient.

The size of a space between the spot-fused portions is varied depending upon how the film is easy to slip, the number of films piled, the fusion strength and whether other processings are applied. In general, the size of space is 1 to 30 cm, preferably 5 to 20 cm. Briefly, it is sufficient that such a size that even when in the multiple film, each film is moved to change its relative position the deviation caused thereby can be absorbed is assured. If the above requirements are satisfied, neither wrinkle nor sag are caused in other portions than both-side edge portions of the rolled film.

When a group of fine scars are densely formed in addition to providing spot-fused portions in both-side edge portions, the effect of this invention is much more increased.

Figure 5A:
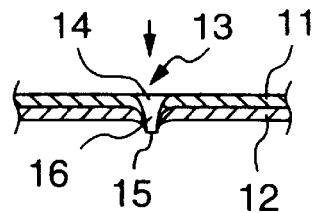
Figure 5B:
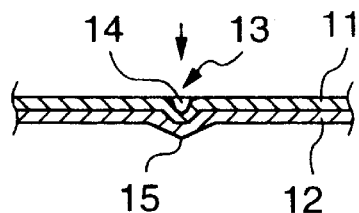

In this invention, the scars are flaws formed by pressing the multiple film from one side by means of a somewhat pointed material as shown in FIGS. 5A and 5B, and these flaws are preferably such that the film projects from the other side of the multiple film.

Figure 11:
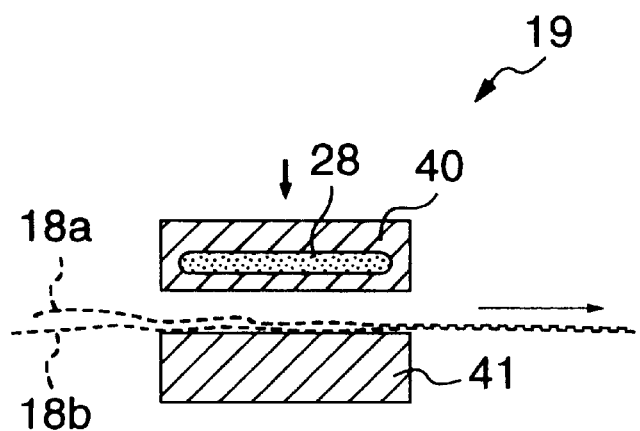
FIG. 11 is a sectional view of another intermittently fusing means free from hot pins.

In FIGS. 5A and 5B, 11 refers to the first film and 12 to the second film. The two are merely put one on the other, are not bonded to one another at all, and are in such a state that they can be freely mutually moved in other portions than the scars. 13 refers to a scar, a concave 14 is formed by pressing the first film 1 by means of a working tool in the arrow direction, the first film is fitted in the concave of the second film to bond the two films in this position. Moreover, the second film 12 indirectly pressed projects to the opposite side surface to form a protrusion 15. The protrusion 15 has the action of a wedge that at least two films which can be freely mutually moved are connected for the necessary period of time.

FIG. 5a shows the case where the scar 13 forms a perforation 16, and FIG. 5B shows the case where the scar 13 does not form a perforation but merely a protrusion 15 in the second film 12.

In this invention, the scar 13 does not always have a perforation and it is sufficient that the first film is fitted in the second film. In the case of FIG. 5B, the outer surface of the second film 12 project; however, even when the second film does not project, the object of this invention can be achieved when the two films are assuredly locally bonded.

In FIGS. 5A and 5B, a double layer film is shown; however, even when this film has three or more layers, the same applies.

The scar 13 is densely provided in both-side edge portions of the multiple film.

When this multiple film is rolled, for example, in such a way that the first film 11 becomes an inner surface, the second film 12 becomes an outer surface. In the side edge portion of the second film 12, there are many scar protrusions 15, so that a roll is formed in which the protrusions 15 of the second film 12 are fitted in the concaves 14 of the first film 11 which is wound thereon and contacts with the second film 12.

The thus fitted-in portions or the portions in which the protrusions 15 are not fitted in but intimately contacted with the surface of the first film 11 have strong frictional resistance and tightly fix the multiple film in both-side edge portions to prevent the winding breakage. In addition, in the case where a bag is made by an automatic bag-making-and-packing machine, the fitted-in portions have such a function that the multiple film is united during unwinding, fusing, packing and sealing.

When the multiple film is rolled in such a way that the second film becomes an inner surface, the protrusions 15 of the second film are fitted in the concaves 14 of the first film or the protrusions 15 bite the first film 11, whereby the films which can be freely mutually moved can be kept in the fixed state for the necessary period of time.

The shape of the scar is not critical and may be a circle shape, a triangle shape, a polygon shape, an oval shape or the like as far as the tip is microscopically somewhat pointed. Moreover, it is not necessary that the scars be provided in the form of a dot, and they may be provided in the form of a horizontal line, a vertical line or a slash as far as they are provided in the side edge portions. In short, protrusions 15 are formed on the first film 11, and penetrate into the second film 12. When the third film is present, the shape of scar is not critical as far as the protrusions of the second film penetrate into the third film. The group of scars provided in the side edge portions of such a multiple film have such a function as to tentatively bond the films which can freely mutually moved to one another in the side edge portions.

The space between the scars is 3 to 15 mm, preferably 7 to 15 mm.

When the film is further rolled, the protrusions 15 in the side edge portions knock against the film surface which contacts the protrusions, and consequently, the thickness of the side edge portion becomes larger, and the protrusions are entangled with one another to make it assured to roll the film. In the center portion, each film of the multiple film is loosely rolled and a play is kept between the films, and hence, neither wrinkle nor sag is formed. Moreover, when the roll is unwound, the outermost layer multiple film does not stick to the subsequent layer multiple film, and hence, the unwinding is not impeded, and a roll state is obtained which is more suitable to the automatic bag-making-and-packing machine.

Only spot-fused portions may be provided or both spot-fused portions and a group of scars may be provided together as far as they have such a function as to unite the multiple film during unwinding the multiple film and then carrying out bug-making, packing and sealing in the automatic bag-making-and-packing machine.

When a group of scars are provided, the method of providing the same is not critical; however, it is preferable to press the side edge portions of the multiple film using a rotating disk. This disk has many protrusions on its periphery and the protrusions press the side edge portions of the multiple film. The protrusions have a sectional shape of triangle. It is preferable to scatter or arrange zigzag dot-like protrusions pointed like a drill which constitute scars. Also, it is possible to arrange and use slender ridge-like protrusions. In this case, the ridge-like protrusions have preferably a sectional shape of triangle.

The length of the protrusion and the pressing pressure are varied depending upon the kind of the multiple film, and are such that when pressed from one surface of the multiple film the protrusion appears on the other surface.

Even if the protrusions do not appear on said other surface, it is sufficient that the layers of the multiple film are entangled with one another and the layers of the multiple film are tentatively bonded by a synergistic effect between the protrusions and the spot-fused portions to such an extent that they are not separated from one another during the unwinding of the film and subsequent carrying out of bag-making, packing and sealing in an automatic bag-making-and-packing machine.

The spot-fused portions may be provided together with the group of scars or in separate portions.

It is also possible to use the first film having fusible layers on both surfaces and use a double layer film in which the layers are in the mutual blocking state together with a second film and a third film.

The blocking state does not mean the state in which the contacting fusible films have been completely united with an adhesive or by fusion, but the state in which the contacting films are weakly bonded by the mutual tackiness, for example, self-tackiness, tentative tackiness due to plasticizer, or the like, and can be easily separated by a light force. Briefly, the films are in a somewhat sticky state.

An explanation is made below of the process for producing a packed multiple bag of this invention and the apparatus of this invention to be used in the production process referring to the drawings.

The process for producing a packed multiple bag of this invention comprises a step of forming a multiple film by putting at least two sheets of film one on another, a step of discontinuously providing spot-fused portions along both-side edge portions of the multiple film, by which spot-fused portions the at least two sheets of film are partially united, a step of fusing the multiple film in the longitudinal direction to form a cylindrical film, a step of packing contents in the cylindrical film and fusing the cylindrical film in the transverse direction, and a step of cutting the fused portion in the transverse direction.

The apparatus of this invention for producing the packed multiple bag comprises a film-feeding means having at least two film-feeding rolls, a means for fusing in the longitudinal direction, a means for packing contents, a means for fusing in the transverse direction, a means for cutting the fused portion in the transverse direction, and a spot-fusing means for intermittently fusing at least two films fed from the said at least two film-feeding rolls in the state that the films are put one on another, along their both-side edge portions, the spot-fusing means being provided between the film-feeding means and the means for fusing in the longitudinal direction.

Figure 6:
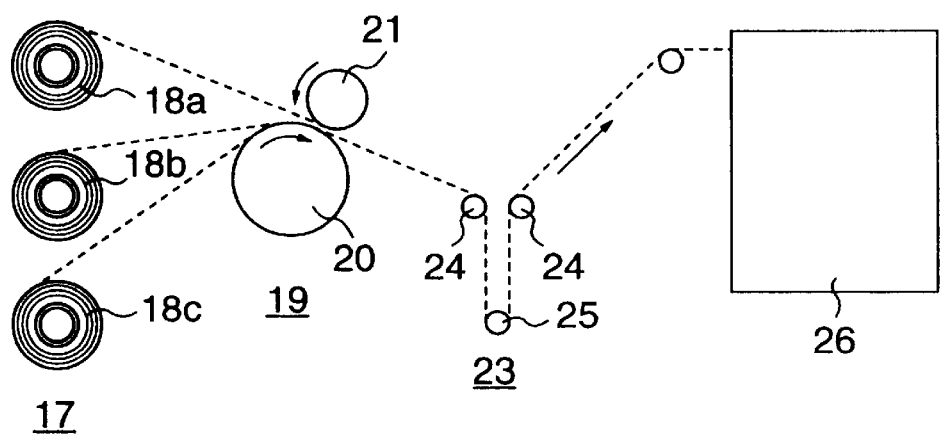
FIG. 6 is an outlined view of the apparatus for producing a packed multiple bag of this invention.

FIG. 6 is an outlined view of the apparatus of this invention for producing the packed multiple bag. The film-feeding means 17 is provided with at least two film-feeding rolls 18. In FIG. 6, the film-feeding means is provided with three film-feeding rolls 18a, 18b and 18c. It is preferable for the film-feeding means 17 to have a means for controlling the tension of the film to be fed.

Alternatively, it is possible to provide a film-feeding means in which at least two films are rolled together on one film-feeding roll, in place of the at least two film-feeding rolls. However, when at least two films are rolled on one film-feeding roll, winding breakage is apt to be caused, and hence, it is more preferable to provide a group of fine protrusions which reach from one film to another film, in both-side edge portions to entangle the films, thereby preventing winding breakage.

When the group of fine protrusions are provided, the method of providing the same is not critical, and, for example, the at least two sheets of film put one on another are pressed using a rotating disk. This disk has a group of many fine protrusions on its periphery.

The length of the protrusion and the pressing pressure are varied depending upon the kinds of at least two films to be processed and are such that when the protrusions are pressed from one film surface, they appear on the other film surface. Alternatively, even if the protrusions do not appear on the other film surface, it is sufficient that the at least two films are entangled, tentatively bonded and stably rolled without causing winding breakage.

As the fusing means 19, it is possible to use a pair of back-up roll 20 and hot pin roll 21 which are rotated in opposite directions at the same speed in contact with each other. The hot pin roll 21 has many heated pins (22 in FIG. 7) projecting from the outer periphery, and the heated pins 22 enable the at least two films fed from the film-feeding rolls 18a, 18b and 18c in FIG. 6 to be locally melt-united. The back-up roll 20 has coated thereon a releasable material resistant to the heat and the pressing pressure during the processing.

Only one of the back-up roll 20 and the hot pin roll 21 may be driven or both of them may be driven.

Figure 7:
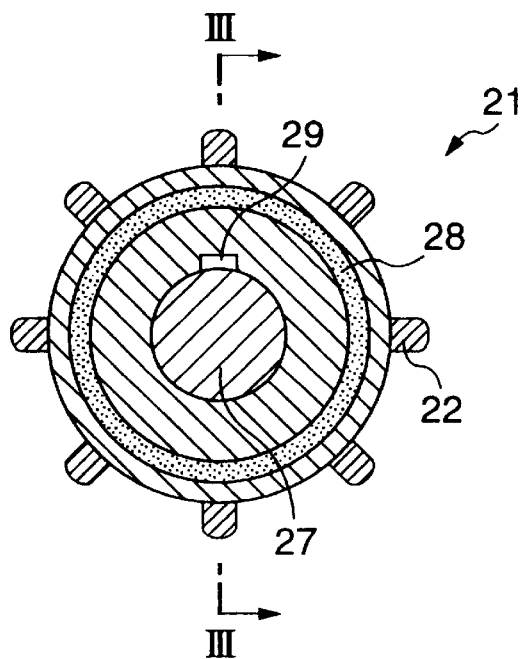
FIG. 7 is a sectional view of a hot pin roll.
Figure 8:
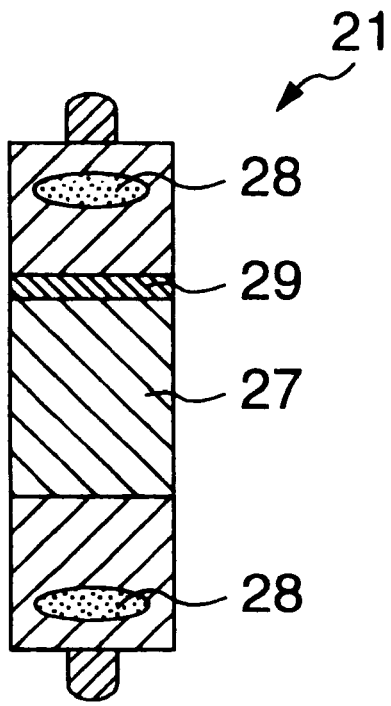
FIG. 8 is a sectional view of the hot pin roll at the III—III line in FIG. 7.

FIG. 7 is a sectional view of the hot pin roll 21 and FIG. 8 is a sectional view of the hot pin roll of FIG. 7 at the III—III line. The hot pin roll 21 is a disk which is rotated with the rotation of the rotary shaft and heaters 28 are embedded near the periphery of the disk to heat the hot pins 22. 29 refers to a keyway for assuredly associating the hot pin roll with the rotary shaft 27.

The hot pin roll 21 may be fitted with the hot pins 22 in a line or plural lines or zigzag on the peripheral surface of the hot pin roll 21. The pitch of the intermittent fusions is varied depending upon the pitch of the hot pins planted and can be determined appropriately depending upon the kind of film, the kind of bag to be produced and the contents to be packed. Also, the heating temperature of the hot pins 22 are varied appropriately depending upon the kind and thickness of film to be used, the pressing pressure, the packing speed and the like.

Figure 9A:
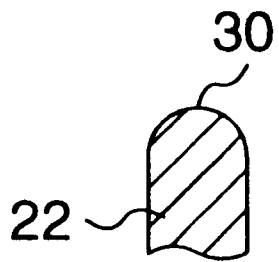
FIGS. 9A and 9B are sectional views showing the specific shapes of the hot pin.
Figure 9B:
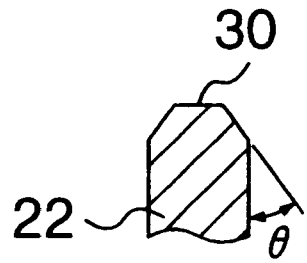

In general, as the hot pins, there are planted metal bars having a diameter of 2 to 10 mm and a projection length of 1 to 10 mm and having a pointed tip 30. The specific shapes of the hot pin are such that the diameter is 6 mm, the length of the projected portion is 3.5 mm and the tip 30 has a half circle shape as shown in FIG. 9A or such that the diameter is 6 mm, the length of the projected portion is 3.5 mm and the diameter of the tip 30 is 3 mm and the point angle $\theta$ of the tip 30 is 30° as shown in FIG. 9B.

Figure 10:
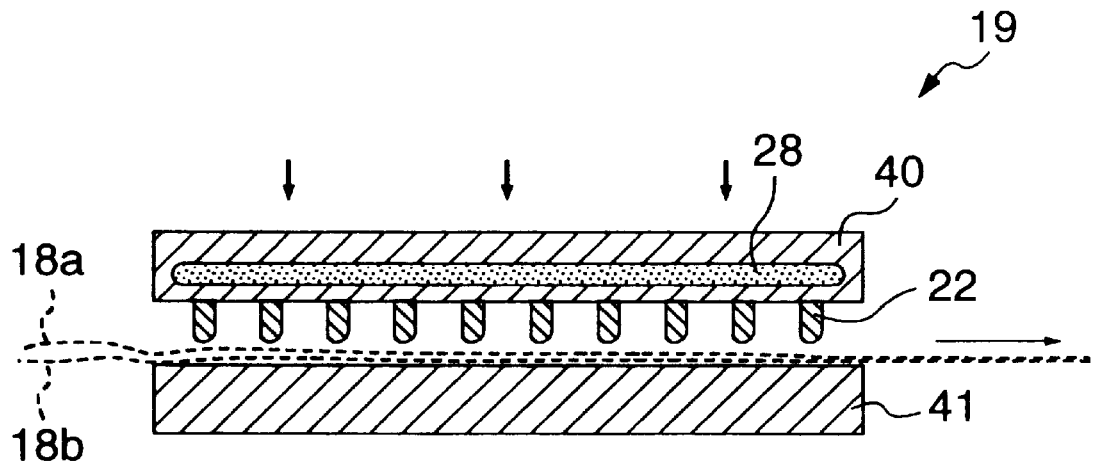
FIG. 10 is a sectional view of a intermittently fusing means having other hot pins.

Another fusing means 19 consists of, as shown in FIG. 10, the first plate 40 having a built-in heater 28 for heating the projected hot pins 22 and the second plate 41 placed in parallel thereto.

At least two films fed from the film-feeding rolls 18a, 18b and 18c are intermittently moved between the first plate 40 and the second plate 41 which are intermittently opened and closed so as to meet the timing of the opening and closing of the plates. That is, when the first plate 40 and the second plate 41 are closed and the films are discontinuously fused with the hot pins, the films are stopped, and when the fusion is completed and the plates are opened, the films are sent by the given distance.

By repeating the above intermittent operation, the at least two films are discontinuously fused and consequently spot-fused portions become scattered on the film surface.

The opening and closing of the plates may be carried out by moving the first plate 40 and the second plate 41; however, it is preferable that the second plate is allowed to rest and the first plate 40 is moved to carry out the opening and closing movement. The number of the hot pins 22 may be one; however, it is preferable that plural hot pins project. They may be arranged in a line or plural lines or arranged zigzag, and the arrangement is not critical. The pitch of the discontinuous, or scattered fusions can be varied appropriately depending upon the pitch of the hot pins planted, the kind of film, the kind of bag to be produced and the contents to be packed.

The surface of the second plate 41 contacting the first plate 40 is coated with a releasable material resistant to the heat during the intermittent fusion processing and to the pressing pressure. In the fusing means 19 shown in FIG. 10, the hot pins shown in FIGS. 9A and 9B are also preferably used.

Moreover, there is a case where the hot pins 22 are not projected from either the first plate 40 or the second plate 41. In this case, the plates are short as shown in FIG. 11, and when the first plate 40 is contacted with the second plate 41, there is formed a fused portion having the same length as the plate in the longitudinal direction.

In this invention, it is necessary that unfused portions through which air present between the at least two films can be escaped be present and simultaneously it is necessary that the unfused portions are present at such a space that neither wrinkle nor sag are not generated between the at least two films. Accordingly, it is important, though the shapes of the hot pin and the plate do not become a problem, that the place and length be kept so that the wrinkle of the film can be absorbed and it is also important that the place and length be such that the automatic bag-making-and-packing machine can work without any troubles during bag-making.

In FIG. 6, 23 is an accumulator, and a dancer roll 25 which can be moved upwardly and downwardly is provided between a pair of fixing rolls 24. In FIG. 6, a pair of fixing rolls and a dancer roll are illustrated; however, plural pairs of fixing rolls may be used. From the fusing means 19, an intermittently fused multiple film is continuously fed; however, in the automatic bag-making-and-packing machine 26, there is a time at which the flow of the film is stopped every production of one bag, and the demand of the film is intermittent. The dancer roll 25 is moved downwardly when the demand of the film by the automatic bag-making-and-packing machine 26 is stopped, to store the film and when the automatic bag-making-and-packing machine 26 uses the film in a large amount, the dancer roll 25 is moved upwardly to feed a large amount of the film.

By providing the dancer roll, in the hot pin means shown in FIGS. 7 and 8, the film is continuously fed from the film-feeding roll without the flow of the film being stopped, so that the feed of a heat from the heated pin to the film is stabilized, whereby the uniform intermittent fusion is made possible.

On the other hand, in the fusing means shown in FIGS. 10 and 11, the fusion is effected intermittently, but the preferable contacting space between the first plate and the second plate is not consistent with the preferable bag-making space of the automatic bag-making-and-packing machine in many cases. Accordingly, by providing the dancer roll, it is made possible to operate both the fusing means and the automatic bag-making-and-packing machine at the best spaces.

Figure 12:
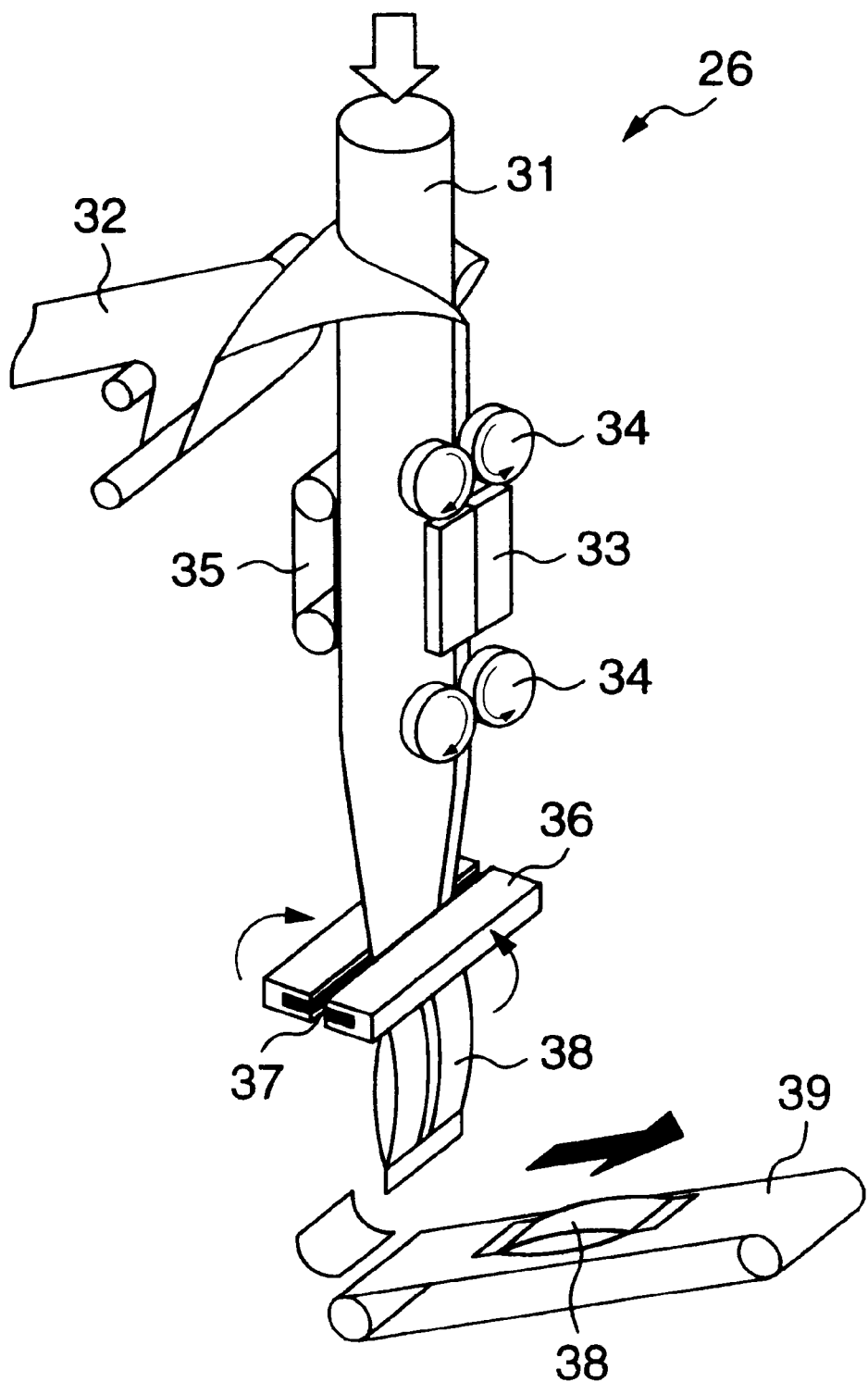
FIG. 12 is a perspective view of an example of an automatic bag-making-and-packing machine.

FIG. 12 is a perspective view of an example of an automatic bag-making-and-packing machine. 26 is a known automatic bag-making-and-packing machine, and this is generally of a vertical type or a horizontal type, which include various types such as three-way sealed type, four-way sealed type, pillow type, gusset type and the like. However, the fusing means in this invention may be installed before the vertical fusing means for fusing the film in the longitudinal direction.

In FIG. 12, a vertical pillow type automatic bag-making-and-packing machine is shown as an example; however, this invention is applicable to any of automatic bag-making-and-packing machines of known types such as a vertical pillow type, a horizontal pillow type, a vertical three-way sealing type, a horizontal three-way sealing type and other types.

31 is a sailor, the top of which is provided with a hopper which is a part of the content-packing means. In the case of a horizontal type automatic bag-making-and-packing machine, a different type content-packing means is used. The film 32 fed is wounded round the sailor 31, the back surfaces of both side edges are contacted with each other, the film is sent downward in this state, the back surfaces are bonded by means of a heated vertical sealer 33 to complete the vertical sealing. At this time a tap, not shown in FIG. 12, may be attached to the film between the vertical sealer 33 and a horizontal sealer 36. 34 is a feed roller and 35 is an auxiliary belt. The horizontal sealer 36 press-fuses the vertically sealed film in the form of a cylinder by means of a pair of hot sealing bar in the direction perpendicular to the cylindrical film to form a bag bottom. Thereafter, a given amount of the contents is packed therein from the top of the sailor 31 and then the bag is moved down by the length of one bag. At this time, the bag is horizontally sealed by means of a horizontal sealer provided with a horizontal fused portion cutter 37 in the center portion of the sealed portion, whereby the opening of the preceding bag is sealed and simultaneously the bottom of the succeeding bag is formed. 38 is a finished pillow type sealed packed bag. The sealed packed bag 38 produced is conveyed to the given place by means of a belt conveyer 39.

Figure 13:
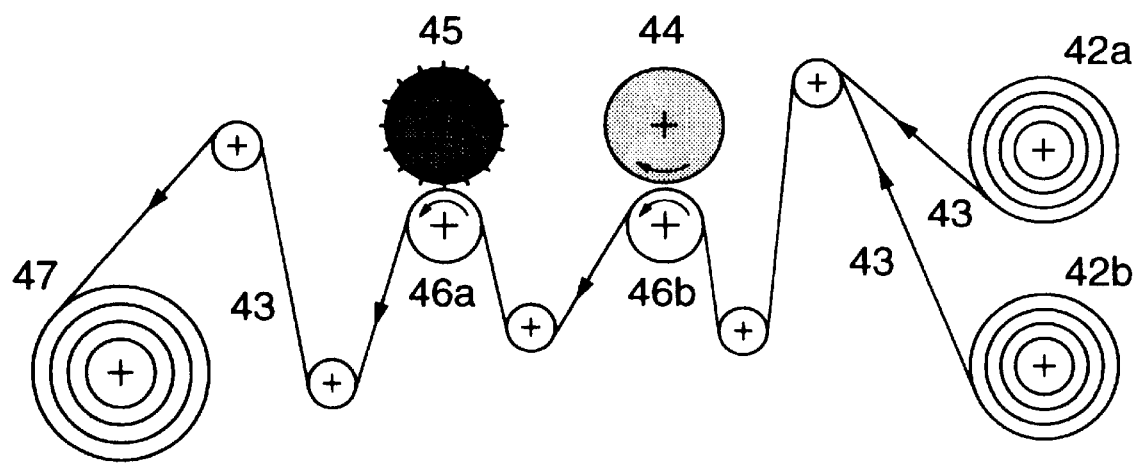
FIG. 13 is an outlined view of an example of the apparatus for producing the rolled multiple film.

FIG. 13 is an outlined view of an apparatus for producing a rolled film. From film rolls 42a and 42b, two sheets of film 43 are put one on the other on a roller, and the resulting assembly is fed to between a scar-imparting means 44 and its back-up roll 46b. A double layer film having scars imparted on its surface is fed to between a spot-fusing means 45 and its back-up roll 46a. The films locally united by the spot-fusion are rolled in the form of a multiple film roll 47.

EXAMPLE 1

To both sides of a biaxially oriented nylon film which had been coated with polyvinylidene chloride (referred to hereinafter as $KON_{\#15}$) were laminated a low density polyethylene film (referred to hereinafter as PE) and a linear, low-density polyethylene film (referred to hereinafter as LL) by an extrusion coating method to produce the first film having a width of 1 m which was a laminated film composed of $LL_{15}/PE_{15}/KON_{\#15}/PE_{20}/LL_{30}$ (hereinafter, suffixes refer to thicknesses in $\mu$m and "#" means a film). The surfaces of both terminal LL's were roughened using a textured roll as a cooling roll in the extrusion step.

Subsequently, using the apparatus shown in FIG. 6, the $LL_{30}$ side of the first film was put on a second film of $LL_{\#75}$ having a width of 1 m, and both-side edge portions of the resulting assembly were spot-fused to form dot-like spot-fused portions 4 in the form of a circle having a diameter of 3 mm arranged in a line at spot-fusion spaces of 10 cm. This assembly was rolled on a paper tube having a nominal diameter of 3 inches, a paper thickness of 12 mm and a length of 1.1 m so that the second film $LL_{\#75}$ became inside to prepare five rolls each having a length of 300 m and five rolls each having a length of 600 m. By this method, there were obtained winding-breakage-free multiple film rolls in which both-side edge portions were somewhat swollen.

The spot-fusing processing was carried out by passing the first film and the second film in the state that the two are put on each other through between a disk of 10 cm in diameter having circular protrusions of 3 mm in diameter on its periphery heated to 270° C. and a silicone rubber-lined back-up roll.

Corrugated paper having a thickness of 2 cm, an inner diameter of 3 inches and an outer diameter corresponding to the diameter of the film roll obtained was applied to both sides of the rolled film and the resulting assembly was packaged with a polyethylene film, and subsequently, a steel tube having a nominal diameter of 32A and a length of 1.3 m was inserted into the paper tube. Both ends of the steel tube were placed on a rack to allow the roll to hang so that the weight of the roll per se was not applied to the roll. This rack was placed on a truck and transported about 500 Km to find that none of the five 300-m rolls caused winding breakage, but 4 of the five 600-m rolls caused winding breakage owing to the slippage of film. The winding breakage was not owing to the film slippage between the first film and the second film but the film slippage between the multiple films.

Using a vertical pillow type packing machine, the 300-m roll film and the 600-m roll film which did not cause winding breakage were formed into a pillow type bag so that the second film $LL_{\#75}$ became the inside of bag and simultaneously 10 Kg of water was packed in the resulting bag. In either case of the 300-m roll or the 600-m roll, the first film and the second film were able to be smoothly subjected to continuous operation without causing slippage nor wrinkle.

One packed bag was placed in one corrugated box, and nine boxes thereof were arranged (3×3, single pile) and vibrated at each temperature of 29° C. and 3° C. for 40 minutes in the vertical direction and for 20 minutes in the horizontal direction using a vibration testing machine manufactured by IMV while continuously changing the frequency between 5 Hz and 50 Hz and keeping the vibration acceleration speed at 0.75 G. This vibration test was repeated twice on each of the boxes at each temperature of 29° C. and 3° C. In total, 18 bags were tested at each temperature. In any of the bags, no pinhole was formed in either of the first and second films and water did not leak out of the films.

EXAMPLE 2

The same first and second films as in Example 1 were put one on the other in the same manner as in Example 1. Moreover, in the present Example, a group of dot-like scars were arranged zigzag in 7 lines at a space of 3.5 mm on the outer surface of the spot-fused portion. In the processing, the multiple film was pressed on the outside of the spot-fusion in the side edge portion by means of a processing tool in which triangular protrusions were arranged on the periphery of a disk having a thickness of 3.5 mm zigzag in 7 lines in the thickness direction of the disk and zigzag at a pitch of 1.5 mm in the peripheral direction. This multiple film was rolled in the same manner as in Example 1 to form five 600-m rolls and the rolls were packaged in the same manner as in Example 1, after which the five packaged rolls were transported about 500 Km by truck. None of the rolls caused winding breakage.

Reference Example 1

The same first and second films as in Example 1 were put one on the other and dot-like scars were imparted in both-side edge portions in the same manner as in Example 2. This multiple film was rolled on a paper tube having a nominal diameter of 3 inches, upon which winding breakage was easily caused owing to the slippage of film when about 200 m of the film was rolled. In many cases, the winding breakage was mainly caused owing to film slippage between the first and second films and also caused owing to film slippage between the multiple films.

Comparative Example 1

For comparison, to the same first film as in Example 1 was laminated the second film $LL_{\#75}$ by a dry lamination method, whereby a film of $LL_{15}/PE_{15}/KON_{\#15}/PE_{20}/LL_{30}//LL_{\#75}$ was prepared.

When the film was subjected to the same test as in Example 1, nine of 50 bags were broken.

EXAMPLE 3

The second film 2 of $LL_{\#50}$—$LL_{\#50}$ was put on the $LL_{30}$ surface of the first film 1 consisting of $LL_{15}/PE_{15}/KON_{\#15}/PE_{20}/LL_{30}$ obtained in Example 1 in the same manner as in Example 1. Moreover, in the present Example, a group of dot-like scars was arranged zigzag in a width of 3.5 mm in 7 lines on the outside of the spot-fused portions. In the processing, the outside of the spot-fused portions in the side edge portion of the multiple film was pressed by means of a processing tool in which triangular protrusions were arranged zigzag in 7 lines on the peripheral surface of a rotary disk having a thickness of 3.5 mm.

The $LL_{\#50}$—$LL_{\#50}$ film was a linear low-density polyethylene film having a total thickness of 100 μm in which the inner surface was mutually blocked, namely, sticky, obtained by subjecting a linear, low-density polyethylene film having a thickness of 50 μm to an inflation molding method to form a film having a thickness of 50 μm and a perimeter of about 2 m, drawing off the film by means of a drawing-off nip roll and simultaneously folding the tube-shaped film, applying a pressure thereto, thereafter cutting off the folding portion of both ends of the film by means of a slitter.

This piled film was rolled on a paper tube having a nominal diameter of 3 inches and a paper thickness of 12 mm to obtain a 500-m length roll quite free from wrinkle having a diameter of 360 mm.

In case spot-fusions and a group of fine scars were densely provided in the side edge portions of the multiple film, winding breakage was not caused and winding wrinkle was not generated when the film was rolled on the paper tube. Accordingly, when the film was subjected to an automatic bag-making-and-packing machine, such an effect that the roll was more smoothly unwound was recognized.

This application is based on Japanese Patent Application No. 08-091832 filed Mar. 22, 1996, Japanese Patent Application No. 08-214033 filed Jul. 26, 1996 and Japanese Patent Application No. 08-035757 filed Jan. 31, 1996, the contents of which are in their entirety incorporated into the specification by reference.

What is claimed is:

1. A film for a multiple bag which film is a multiple film comprising at least two sheets of film put one on another and having scattered along its both-side edge portions spot-fused portions by which the at least two sheets of film are partially united.

2. The film for a multiple bag according to claim 1, wherein the surfaces of the spot-fused portions of the multiple film have irregularities.

3. A film for a multiple bag which film is a multiple film comprising at least two sheets of film put one on another, and having scattered along its both-side edge portions spot-fused portions by which the at least two sheets of film are partially united, and simultaneously having a group of fine scars provided on the surfaces of the spot-fused portions.

4. The film for a multiple bag according to claim 3, wherein each scar of the group of scars is such that one film locally enters the adjacent film to form protrusions on the surface of the adjacent film.

5. The film for a multiple bag according to claim 3, wherein at least one surface of the mutually adjacent film surfaces is roughened.

6. The film for a multiple bag according to claim 3, wherein a part or all of the scars have perforations.

7. A process for producing a packed multiple bag, which comprises a step of forming the multiple film of claim 1 by putting at least two sheets of film one on another, a step of discontinuously providing spot-fused portions along both-side edge portions of the multiple film, by which spot-fused portions the at least two sheets of film are partially united, a step of fusing the multiple film in the longitudinal direction to form a cylindrical film, a step of packing contents in the cylindrical film and fusing the cylindrical film in the transverse direction, and a step of cutting the fused portion in the transverse direction.

8. The process for producing a packed multiple bag according to claim 7, wherein prior to the fusion of the multiple film in the longitudinal direction, fine scars are provided along both-side edge portions of the multiple film.

9. An apparatus for producing a packed multiple bag, which comprises a film-feeding means having at least two film-feeding rolls, a means for fusing in the longitudinal direction, a means for packing contents, a means for fusing in the transverse direction, a means for cutting the fused portion in the transverse direction, and a spot-fusing means for intermittently fusing at least two films fed from the at least two film-feeding rolls in the state that the films are put one on another, along their both-side edge portions, the spot-fusing means being provided between the film-feeding means and the means for fusing in the longitudinal direction.

10. An apparatus for producing a packed multiple bag, which comprises a film-feeding means having a film-feeding roll in which at least two films are rolled together, a means for fusing in the longitudinal direction, a means for packing contents, a means for fusing in the transverse direction, a means for cutting the fused portion in the transverse direction, and a spot-fusing means for intermittently fusing at least two films fed from the film-feeding rolls in the state that the films are put one on another, along their both-side edge portions, the spot-fusing means being provided between the film-feeding means and the means for fusing in the longitudinal direction.

11. The apparatus for producing a packed multiple bag according to claim 9 or 10, wherein the spot-fusing means is composed of a back-up roll and a hot pin roll which are rotated in the same peripheral speed in the opposite directions and at least two films fed from the film-feeding roll or rolls are passed in the state that the films are put one on another through between the back-up roll and the hot pin roll.

12. The apparatus for producing a packed multiple bag according to claim 9 or 10, wherein the spot-fusing means is composed of two plates, one of which is a hot plate, and at least two films fed from the film-feeding roll or rolls are passed in the state that the films are put one on another through between the two plates which are intermittently opened and closed.

13. The apparatus for producing a packed multiple bag according to claim 9 or 10, wherein the spot-fusing means is composed of two plates, one of which is a hot plate having hot pins projecting therefrom, and at least two films fed from the film-feeding roll or rolls are passed in the state that the films are put one on another through between the two plates which are intermittently opened and closed.

14. The film for a multiple bag according to claim 1, wherein said both-side edge portions are along a longitudinal edge, and wherein said sheets of film are not laminated.

* * * * *

UNITED STATES PATENT AND TRADEMARK OFFICE
CERTIFICATE OF CORRECTION

PATENT NO.    : 5,981,028
DATED         : November 9, 1999
INVENTOR(S)   : Sugawa, et. al.

It is certified that error appears in the above-identified patent and that said Letters Patent is hereby corrected as shown below:

Title page, item [22], change "Mar. 20, 1997" to --Mar. 19, 1997--

Signed and Sealed this

Twelfth Day of September, 2000

Attest:

Q. TODD DICKINSON

*Attesting Officer*    *Director of Patents and Trademarks*